United States Patent [19]

Eustacchio

[11] 4,357,762
[45] Nov. 9, 1982

[54] APPARATUS FOR CONTROLLING THE VENTILATION EFFECT ON MATERIAL DRIED IN A TUNNEL DRYING PLANT

[75] Inventor: Claudio Eustacchio, Graz, Austria

[73] Assignee: Fuchs & Co. Aktiengesellschaft fur Elektrodraht-Erzeugung und Maschinenbau, Austria

[21] Appl. No.: 237,786

[22] Filed: Feb. 24, 1981

[51] Int. Cl.³ .............................................. F26B 15/16
[52] U.S. Cl. ........................................ 34/229; 34/231; 432/148; 432/194
[58] Field of Search ................. 34/231, 229, 222, 155, 34/227, 228; 432/141, 144, 148, 152, 194

[56] References Cited

U.S. PATENT DOCUMENTS 2,270,111 1/1942 Daley ..................................... 34/222
2,612,706 10/1952 Simpson et al. ....................... 34/231
2,794,774 6/1957 Mora ..................................... 202/117

Primary Examiner—L. I. Schwartz
Attorney, Agent, or Firm—Beveridge, De Grandi & Kline

[57] ABSTRACT

An apparatus for controlling the ventilation effect on material dried in a tunnel drying plant, through which goods in the form of architectural ceramic structures, such as of bricks or tiles, to be dried and placed in layers, are moved in counter-current relation to an air current. The tunnel drying plant is designed with doors at the goods inlet and outlet ends. At the goods outlet end there is a pipe connection for blowing air under gage pressure into the plant, while at the goods inlet end and the top part of the tunnel drying plant there is an aspiration opening with an aspiration pipe connection. In the free cross-section of the flow tunnel drying plant, near the roof, there are air guiding bodies, which may be moved backwards and forwards in the length direction of the plant using cars on rails. These air guiding bodies are hollow and have a streamlined form. They may be put into positions as desired by moving them in step or separately from each other so that the air current, making its way through the free cross-section may be changed in the direction towards the material to be dried, and for this reason better ventilation is assured.

8 Claims, 2 Drawing Figures

APPARATUS FOR CONTROLLING THE VENTILATION EFFECT ON MATERIAL DRIED IN A TUNNEL DRYING PLANT

BACKGROUND OF THE INVENTION

The present invention is an apparatus for controlling the ventilation of material to be dried in a tunnel drying plant, more specially for green architectural ceramic structures, such as bricks or tiles, which are moved through the drying plant in a direction opposite to an air current.

In a tunnel drying plant of this design with a tunnel breadth and tunnel height of some meters, carriages with a size matching the size of the tunnel are moved along it from end to end with the material to be dried on them in layers or stories. The air needed for taking the moisture from the material to be dried is moved through the tunnel drying plant or drying kiln in a direction opposite to the direction of motion of the carriages. Drying plants are known in the prior art in which forced draft heating units are placed along the length of the tunnel, or in which the air is completely or partly removed from the drying tunnel and then let into it again.

The speed of the drying air through a counter-current tunnel drier of the sort noted is about 0.5 to 2.0 m/sec, the air, because of its being heated, moving more specially along the tunnel in the top part of its cross-ection so that goods to be dried in the lower part of the cross-section and in the middle parts of the tunnel will only be dried at a very slow rate.

For stepping up the production throughput of a tunnel drying plant, a suggestion has been made in the prior art to have circulating fans for the dry air along the drying tunnel for circulation of the air across the tunnel cross-section at a speed which is many times higher than the speed at which the air would have without such fans, that is to say simply due to its being forced into and let out from the tunnel, the purpose of such fans being that of evening out the temperature and the moisture level over the tunnel cross-section and acting on the goods to be dried with dry air.

Because, on continuous ventilation of the goods to be dried, water is more quickly evaporated from the outer face of the goods than such water may be replaced by water moving through the capillary spaces in the goods being dried, the goods will be dried out quickly at the outer face and such outer face or skin of the goods will undergo shrinkage at a higher rate than inside the same. For this reason the goods to be dried may be damaged by cracking, spalling and other effects.

For taking care of this shortcoming a tunnel drying plant has been designed in which the circulation fans or blowers are designed so that they may be moved between the trains or lines of goods carriages so that, by means of them, the goods are dried in line with a given program. This puts an end to the shortcoming we have noted with continuous ventilation and the carriages are furthermore ventilated between the circulation fans.

Furthermore, a tunnel drying plant with a low tunnel height has been put forward which only a low layer of goods to be dried, roughly 0.2 to 0.5 meter, is dried in broad counter-current tunnels, the circulation fans being fixed in position, or being able to be moved, over the goods.

With known low level or low-height tunnel drying plants a very much higher throughput speed is produced than is the case with a high-volume tunnel drying plant, the air speed in tunnel drying plant amounting to up to 12.0 m/sec.

Because of this high air speed, it is hard to control the moisture gradient in the tunnel drying plant so that with a such tunnel drying plant only more or less sturdy goods may be dried.

While the shortcoming of a tunnel drying plant with circulation fans is to be seen in the high power need for ventilation of the goods, a tunnel drying plant of low height without forced circulation likewise has a shortcoming inasmuch as there is a high air speed or velocity, which in itself makes the control of the drying process very much harder than in other plant.

SUMMARY OF THE INVENTION

For this reason one purpose of the present invention is that of designing a tunnel drying plant of the sort noted in which the drying effect is made stronger, that is to say made more intensive, by a better control of ventilation without in this respect making circulation fans with a high energy need necessary.

As seen from one angle, it may be said that the process of the present invention is characterized in that hot air is let into the tunnel at the goods outlet end of the same, under a gage pressure, the air is guided down the tunnel cross-section over the goods at a number of positions in the length direction of the tunnel downwards towards the goods, and at the goods inlet end the air is aspirated. The positions at which the air is guided downwards may be changed, by motion in the length direction of the tunnel, while drying is taking place, for example they may be evenly moved backwards and forwards in the length direction of the tunnel. Furthermore, air may be moved through the tunnel in intervals. Further process steps and forms of the apparatus used in the invention of value will be seen from the dependent claims.

In the case of the invention, in a low tunnel drying plant the great free cross-section on hand (through which the drying air is moved slowly from the goods outlet end or the system for blowing air into the tunnel, to the goods inlet end, or aspiration system) such free cross-section being present over the carriage and the goods to be dried placed in low layers over it, air guide bodies are placed stretching normal to the length of the tunnel and which are streamlined and have the function of guiding the air under pressure coming to them towards the goods which are to be moved under the air guide bodies in countercurrent. The air is for this reason forced into the free spaces and into the goods to be dried for moving through them. For causing the action of the air to take place evenly over the goods, placed out in a wide area in the drier tunnel, the air guide parts are supported on moving cars, which are able to be moved backwards or forwards like the circulation fans of known driers for some meters and are for this reason responsible for even or homogenious blowing on the goods with the dry air at a high speed.

Because of the control of ventilation in the present invention for the goods to be dried in controlled intervals, the drying effect becomes stronger without need for circulation fans or blowers, which have a high power requirement. The drying air is moved at the same time relatively slowly through the drier tunnel so that the control of the moisture gradient in the goods may be undertaken in a simple way to be geared to the special needs of the goods being processed. Because the air guide bodies are, with good effect, made with a special profile or made streamlined, and because they may be moved in the length direction, a desired current profile may be produced so that the air is moved in waves through the drying tunnel. The even drying of the goods is assured because the air guide bodies are moved backwards and forwards in the drying operation and the material to be dried itself is moved countercurrentwise with respect to the drying air. Because the air guide bodies are designed as hollow bodies, heating would in theory be possible or it would be possible to have an air pressure producing system within the air guide bodies, by way of which, by using air with a certain degree of vacuum or gage pressure, an effect might be produced on the air moving through the tunnel drier by the use of nozzles or the like.

Further measures, details and useful effects produced by the invention will be seen from the account now to be given, using the figures, which are views of two different working examples of the air guide bodies, placed in the tunnel drier and whose air current system as produced in the air is marked by arrows.

DETAILED DESCRIPTION OF WORKING EXAMPLES OF THE INVENTION

Figure 1:
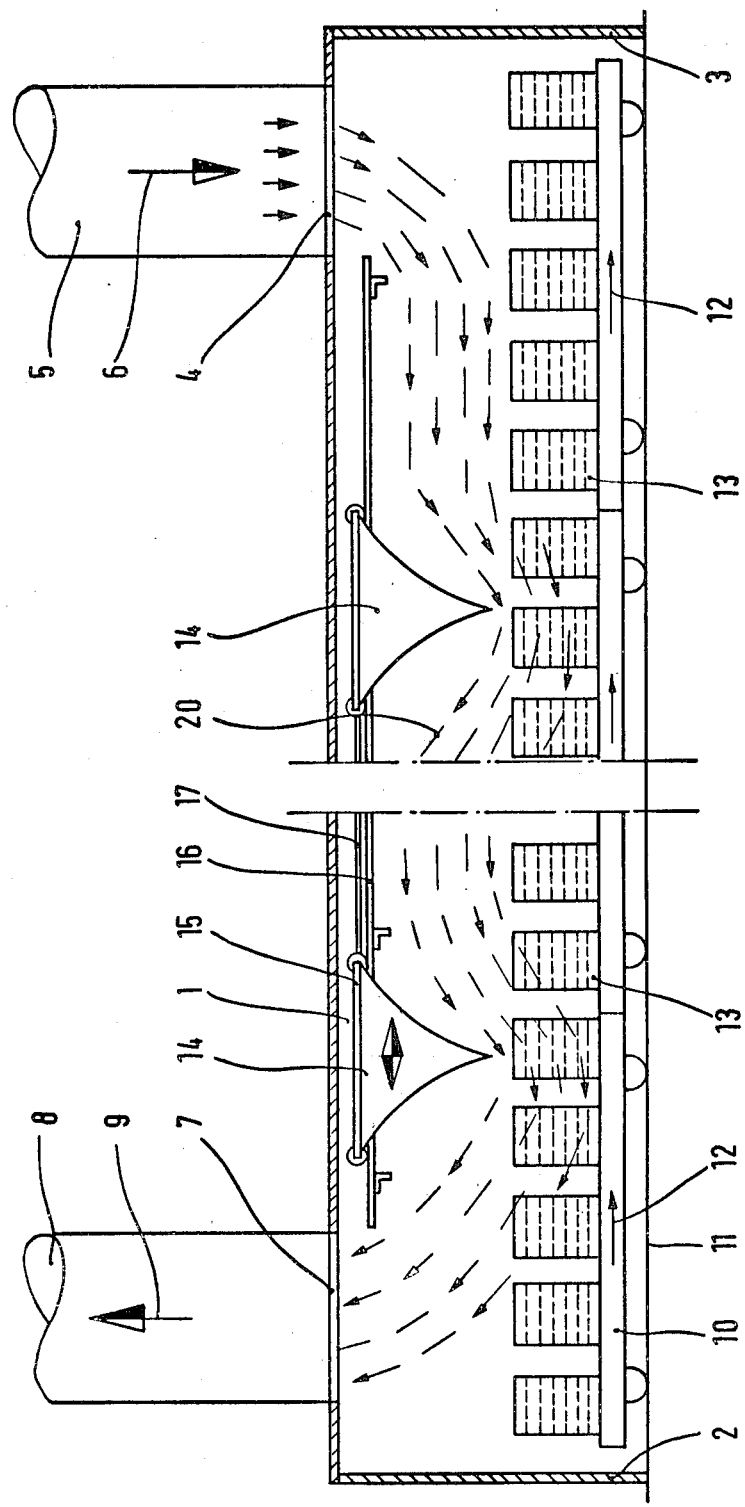
Figure 2:
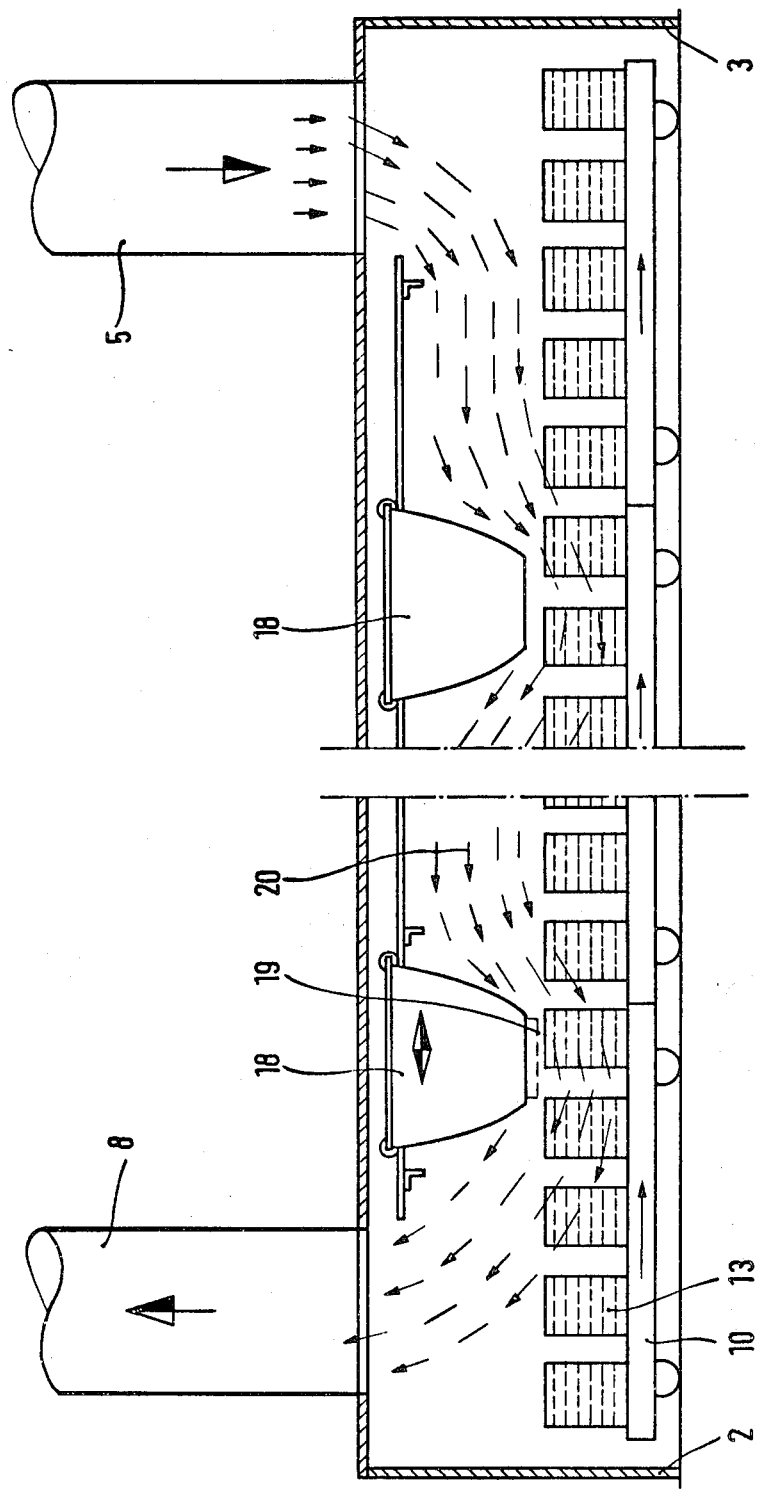

Turning now to the FIGS. 1 and 2 a tunnel drying plant 1 will be seen diagrammatically. The tunnel plant 1 has a door 2 to the left in the figures for driving the goods while at the right hand, outlet end, there is a door 3. At the outlet end there is an air inlet opening 4, with which an air inlet connection pipe 5 is joined. By way of connection pipe 5 air under gage pressure is let into the tunnel drying plant 1 in the direction of arrow 6.

At the goods inlet end, in the top part of the tunnel drying plant 1, there is an air outlet opening 7 joined with an air aspiration connection pipe 8, which is joined with an aspiration apparatus, not shown, for removal of the air, now moist, in direction of arrow 9 out of the tunnel drying plant 1.

Furthermore, in the figures goods carriages 10 are supported on rails 11 and moved smoothly or continuously in the direction of arrows 12 by a driving system which is not shown. The material to be dried or goods 13 is placed on the carriages, the goods in the two working examples being green bricks, that is to say ceramic structures for building purposes and carefully placed in spaced stacks with a view to getting the best drying effect.

In the free cross-section of the blow tunnel drying plant 1 over the goods 13 to be dried there are air guiding bodies 14, which, by the use of cars 15 supported on rails 16 may be moved backwards and forwards in the length direction of the tunnel drying plant 1. These air guide bodies 14 may, as will be seen from the working example of FIG. 1, be joined together by a connection 17 so that only one common driving system is needed for all of them or, see FIG. 2, they may be separately moved, the distance between any one air guide body and the next one then undergoing adjustment as may be desired with the outcome that the flow profile or the flow directions of the gage pressure or forced draft air may be changed as is desired.

The air guide bodies 14 are hollow bodies and have a streamlined outline or profile so that they are responsible, on the one hand, for the air being changed in direction downwards onto the goods 13 to be dried while on the other hand stopping any undesired effects on the current by forming of vortices or the like.

In FIG. 2 it has been made clear diagrammatically with respect to the air guide body 18 on the left that such body has a lower part or aerodynamic structure 19 which may be moved out for adjustment in height, the space between the air guide body and the stacked goods 13 then being changed, if desired, taking into account the height of the stacked goods. The air current 20, which in the two figures is arrowed, is guided downwards between the stacks of architectural ceramic structures as for example bricks or tiles, it making its way through the holes in the bricks so that, putting it somewhat differently, they are dried not only on the outside but further on the inside. Because the tunnel cross-section at the air guide bodies 14 and 18 is blocked for its greater part by such bodies and the rest of the cross-section is very much smaller than the full cross-section, at the air guide bodies the air current will be speeded up so that there will be a stronger or more intense drying effect.

A number of different changes may be made in the invention from its forms as seen in the FIGS. 1 and 2 while still keeping to the general idea of the invention as patented herein. For example the cars 15 may have a remotely controlled and programmable driving system.

I claim:

1. A tunnel drying plant comprising:
    means defining a tunnel for passage of goods therethrough from an inlet end to an outlet end;
    an air inlet blower at said tunnel outlet end for forcing dry hot air into said tunnel;
    an air aspiration unit at said tunnel inlet end for removal of moist air from said tunnel;
    at least one air guide body within said tunnel for passage of goods therebeneath for guiding and forcing air between goods to be dried; and
    at least one car adapted for movement within said tunnel for supporting said at least one air guide body.

2. The invention as claimed in claim 1 having at least two such air guide bodies, such air guide bodies taking up fully a free tunnel cross-section over said goods.

3. The invention as claimed in claim 2 wherein each such air guide body has a streamlined outline and is streamlined with respect to an air current moving towards it and moving from it for producing an even wave-like air current with laminar properties through the goods to be dried.

4. The invention as claimed in claim 1 wherein the air guide bodies are hollow.

5. The invention as claimed in claim 1 wherein said cars have a remotely controlled, programmable driving system.

6. A tunnel drying plant comprising:
    means defining a tunnel for passage of goods therethrough from an inlet end to an outlet end;
    an air inlet blower at said tunnel outlet end for forcing dry hot air into said tunnel;
    an air aspiration unit at said tunnel inlet end for removal of moist air from said tunnel;
    at least one air guide body within said tunnel for passage of goods therebeneath for guiding and forcing air between goods to be dried; and
    at least one car adapted to be moved in the length direction of said tunnel, with one air guide body supported on each car.

7. A tunnel drying plant comprising:

means defining a tunnel for passage of goods therethrough from an inlet end to an outlet end;

an air inlet blower at said tunnel outlet end for forcing dry hot air into said tunnel;

an air aspiration unit at said tunnel inlet end for removal of moist air from said tunnel;

at least one air guide body within said tunnel for passage of goods therebeneath for guiding and forcing air between goods to be dried; and means for changing the height of said at least one air guide body.

8. A tunnel drying plant comprising:

means defining a tunnel for passage of goods therethrough from an inlet end to an outlet end;

an air inlet blower at said tunnel outlet end for forcing dry hot air into said tunnel;

an air aspiration unit at said tunnel inlet end for removal of moist air from said tunnel;

at least one air guide body within said tunnel for passage of goods therebeneath for guiding and forcing air between goods to be dried; and further aerodynamic structures for lengthening said at least one air guide body.

* * * * *